United States Patent [19]

Miyazaki et al.

[11] Patent Number: 4,574,377

[45] Date of Patent: Mar. 4, 1986

[54] SYNCHRONIZATION METHOD AND APPARATUS IN REDUNDANT TIME-DIVISION-MULTIPLE-ACCESS COMMUNICATION EQUIPMENT

[75] Inventors: Sachio Miyazaki, Tokyo; Shinichiro Aoki, Sagamihara, both of Japan

[73] Assignee: Fujitsu Limited, Kawasaki, Japan

[21] Appl. No.: 553,073

[22] Filed: Nov. 18, 1983

[30] Foreign Application Priority Data

Nov. 26, 1982 [JP] Japan ................................ 57-205977

[51] Int. Cl.[4] ............................ H04J 3/06; H04L 3/00
[52] U.S. Cl. .................................... 370/104; 375/108
[58] Field of Search ...................... 370/104, 103, 100; 375/108

[56] References Cited

U.S. PATENT DOCUMENTS

| | | | |
|---|---|---|---|
| 3,795,872 | 3/1974 | Napolitano et al. | 375/108 |
| 3,803,568 | 4/1974 | Higashide | 375/108 |
| 3,974,333 | 8/1976 | May, Jr. et al. | 375/108 |
| 4,019,143 | 4/1977 | Fallon et al. | 375/108 |
| 4,144,448 | 3/1979 | Pisciotta et al. | 375/108 |
| 4,147,894 | 4/1979 | Watanabe et al. | 370/104 |
| 4,282,493 | 8/1981 | Moreau | 375/108 |

FOREIGN PATENT DOCUMENTS

| | | |
|---|---|---|
| 0014945 | 9/1980 | European Pat. Off. |
| 55-82550 | 6/1980 | Japan. |
| 56-89148 | 7/1981 | Japan. |

OTHER PUBLICATIONS

Patent Abstracts of Japan, vol. 6, No. 218, Nov. 1982.

Primary Examiner—Douglas W. Olms
Assistant Examiner—Frank M. Scutch, III
Attorney, Agent, or Firm—Staas & Halsey

[57] ABSTRACT

A synchronization method and apparatus in redundant time-division-multiple-access communication equipment, wherein the synchronization between an active circuit and a standby circuit is carried out using a frequency divided signal from the active transmission frame timing signal instead of using the transmission frame timing signal. At timings other than the output timing of the frequency divided signal, the standby transmission frame counter runs independently. Thus, failure of the active circuit has less effect on the standby circuit and switching between the active circuit and the standby circuit can be carried out smoothly.

10 Claims, 7 Drawing Figures

SYNCHRONIZATION METHOD AND APPARATUS IN REDUNDANT TIME-DIVISION-MULTIPLE-ACCESS COMMUNICATION EQUIPMENT

BACKGROUND OF THE INVENTION (1) Field of the Invention

The present invention relates to a synchronization method and apparatus in redundant time-division-multiple-access (TDMA) communication equipment used for satellite communication and the like.

(2) Description of the Prior Art

Satellite communication networks and the like make use of the TDMA system. The TDMA system enables TDMA using a single radio frequency, but necessitates synchronization of transmission timing between stations.

A redundant transmission (TX) synchronization circuit used in TDMA communication equipment includes an active TX synchronization circuit and a standby TX synchronization circuit of the same construction. If the active circuit fails, the standby circuit takes over the operation. In the prior art, the synchronization between an active TX frame timing signal and a standby TX frame timing signal is frequently checked and corrected. Therefore, there is no problem in switching from the active circuit to the standby circuit when the failure occurs anywhere except in the TX synchronization circuits. If, however, an active TX frame counter fails and the timing of the active TX frame timing signal becomes abnormal, the timing of the standby TX frame timing signal will also become abnormal, thus making the existence of the redundant circuits meaningless.

Publications of interest in regard to the above-mentioned prior art are Japanese Unexamined Patent Publications (Kokai) Nos. 55-82550 and 56-89148.

SUMMARY OF THE INVENTION

An object of the present invention is to provide a synchronization method and apparatus in redundant TDMA communication equipment wherein switching from the active TX synchronization circuit to the standby TX synchronization circuit is smoothly carried out even if the active TX frame counter fails.

According to one aspect of the present invention, there is provided a synchronization method in redundant TDMA communication equipment having at least an active TX synchronization circuit and a standby TX synchronization circuit, which includes synchronizing a standby TX frame timing signal with a frequency divided signal from an active TX frame timing signal, at timings where the frequency divided signal is supplied. The standby TX frame timing signal is independently run at timings where the frequency divided signal is not supplied.

According to another aspect of the present invention, there is provided a synchronization apparatus in redundant TDMA communication equipment having at least an active TX synchronization circuit and a standby TX synchronization circuit, each TX synchronizaion circuit includes a TX frame counter for counting each clock signal and for supplying a TX frame timing signal when the count reaches a predetermined value; a frequency divider for receiving the TX frame timing signal and for generating a frequency divided signal; a TX synchronization correction controller for receiving the TX frame timing signal and synchronization correction signals from a synchronization controller and for delaying the TX frame timing signal in response to the synchronization correction signals; a logic circuit for receiving the TX frame timing signal and the output of the frequency divider of the other TX synchronization circuit, for providing the output of the frequency divider when the output signal of the frequency divider is supplied, and for providing the TX frame timing signal when the output of the frequency divider is not supplied; and a selector for receiving the output of the TX synchronization correction controller, the output of the logic circuit, and signals from a redundant circuit switching controller, for selecting the output of the TX synchronization correction controller when the signal from the redundant circuit switching controller commands the selection of the active side, for selecting the output of the logic circuit when the signal from the redundant circuit switching controller commands the selection of the standby side, and for resetting the TX frame counter by the selected output signal.

DESCRIPTION OF THE PREFERRED EMBODIMENT

Before describing the preferred embodiments of this invention, an explanation will be made with respect to the prior art.

Figure 1:
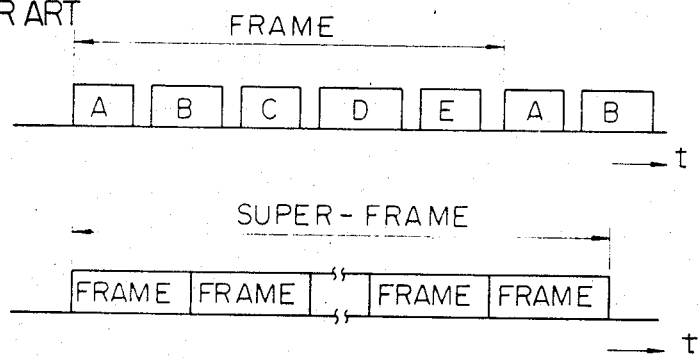
FIG. 1 is a signal diagram explaining burst signals, a frame, and a super-frame in prior art TDMA communication equipment.

The upper portion of FIG. 1 shows the timing location (map) of communication signals from stations in a TDMA system. In FIG. 1, the horizontal axes indicate time (t). Burst signals A, B, C, D and E from the stations are located with the time sharing arrangement shown by the blocks in FIG. 1. The burst signals A to E, for example, form one frame. The lower portion of FIG. 1 shows a super-frame. A super-frame consists of a plurality of the above frames (e.g., 25), i.e., is an assembly of such frames in a larger unit, and transmits, for example, information regarding the burst signal location map.

Figure 2:
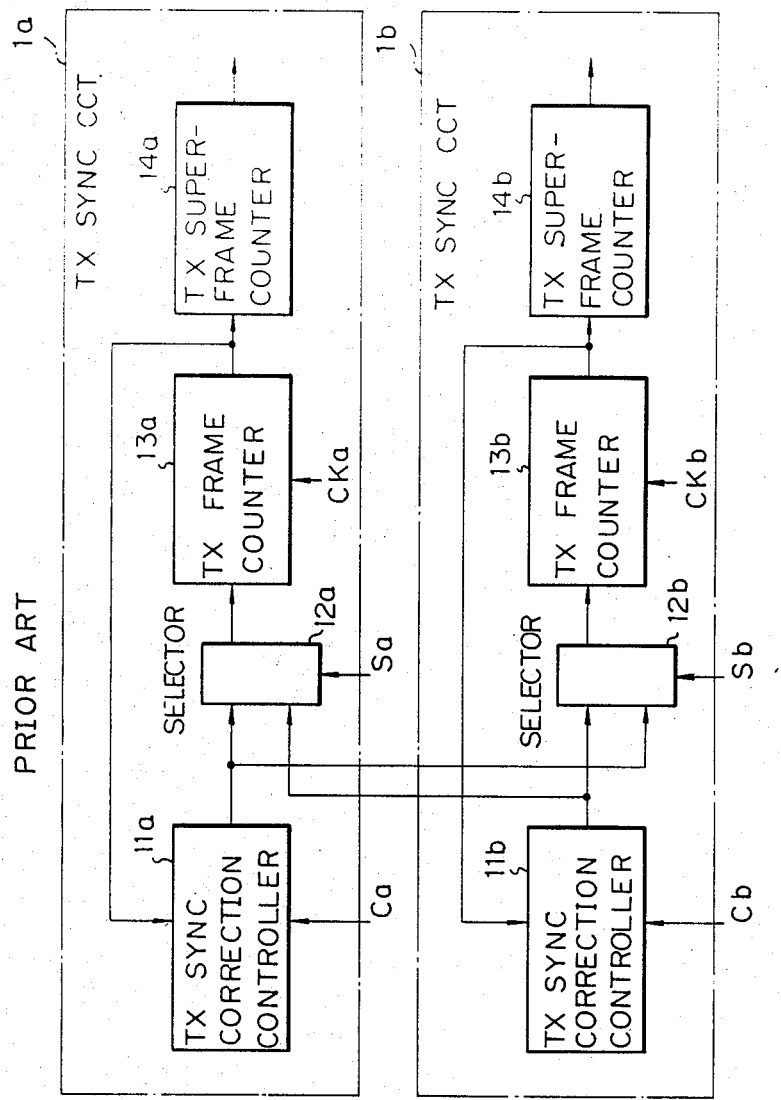
FIG. 2 is a block circuit diagram of a prior art TX syncronization circuit in redundant TDMA communication equipment.

FIG. 2 is a redundant transmission (TX) synchronization circuit in TDMA communication equipment. TX synchronization circuit 1a includes a TX syncronization correction controller 11a, a selector 12a, a TX frame counter 13a, and a TX super-frame counter 14a. Another TX synchronization circuit 1b includes the same elements as the TX synchronization circuit 1a. The elements of the TX synchronization circuit 1b are referenced with the same numbers but with the suffixes "b". When one circuit fails, the other circuit takes over the operation. Here, to avoid complication, the circuit shown in the upper portion of FIG. 2 is referred to as the "active circuit" and the circuit shown in the lower portion of FIG. 2 as the "standby circuit".

The TX frame counter 13a counts a clock signal CKa, generated by a clock signal generator (not shown) contained in each TX synchronization circuit, and outputs a TX frame timing signal when the count reaches a predetermined value. The TX frame timing signal is supplied to the TX super-frame counter 14a and the TX synchronization correction controller 11a as a frame trigger signal. The output of the TX synchronization correction controller 11a is fed back to the TX frame counter 13a through the selector 12a and resets the count.

In the case of the active circuit 1a, the selector 12a is switched by a switching signal Sa from a redundant circuit switching controller (not shown), and the output of the TX synchronization correction controller 11a is switched to the TX frame counter 13a, as mentioned above. The TX synchronization correction controller 11a receives a synchronization correction signal Ca from a TDMA synchronization controller (not shown) and corrects the deviation between a reference burst signal (e.g. block A in FIG. 1) and the TX frame timing signal from the TX frame counter 13a.

In the case of the standby circuit 1b, the same operation is effected, except that the state of the selector 12b differs. The selector 12b is switched so that the output of the TX synchronization correction controller 11a is supplied to the TX frame counter 13b. Therefore, while the TX frame counter 13b counts its own clock signal CKb and outputs a TX frame timing signal, when the count reaches a predetermined value, it is reset by the signal from the active circuit 1a.

Figure 3:
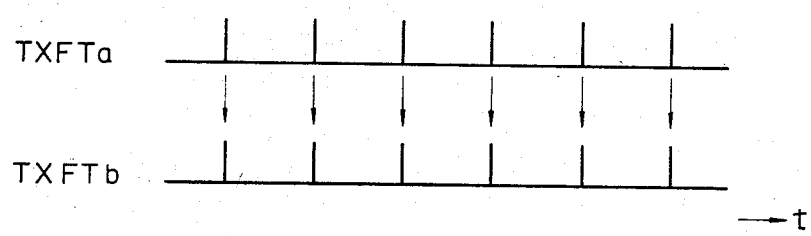
FIG. 3 is a waveform diagram of an active TX frame timing signal TXFTa and a standby TX frame timing signal TXFTb of the circuit of FIG. 2.

FIG. 3 is a waveform diagram of the timing relationship between an active TX frame timing signal TXFTa and a standby TX frame timing signal TXFTb. In the above-mentioned synchronization method, the phases of the active and the standby TX frame timing signals are made to coincide at every frame timing signal (shown in FIG. 3 by arrows). Accordingly, synchronization coupling between the active TX frame timing signal and the standby TX frame signal is frequently performed. Therefore, there is no problem in switching from the active circuit 1a to the standby circuit 1b when failure occurs at portions other than the TX synchronization circuits.

Figure 4:
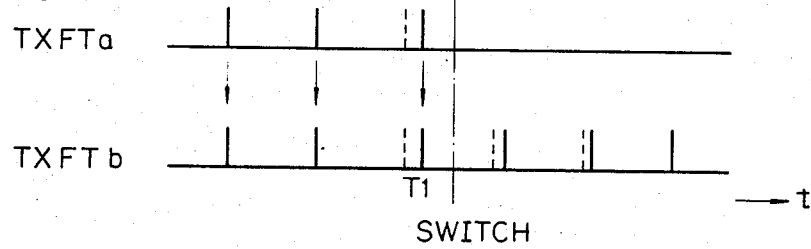
FIG. 4 is a waveform diagram similar to FIG. 3 when the active TX frame timing signal becomes abnormal.

However, as mentioned earlier, when the active TX frame counter 13a fails and the timing of the active TX frame timing signal TXFTa becomes abnormal, the timing of the standby TX frame timing signal TXFTb also becomes abnormal. Namely, as shown in FIG. 4, while the active TX frame signal TXFTa should have the timing shown by the broken line at time T1, if the active circuit fails and the timing of the active TX frame signal TXFTa becomes that shown by the solid line at time T1, the timing of the standby TX frame signal TXFTb also becomes that shown by the solid line. It takes a long time to correct the error when switching from the active circuit 1a to the standby circuit 1b is carried out.

Figure 5:
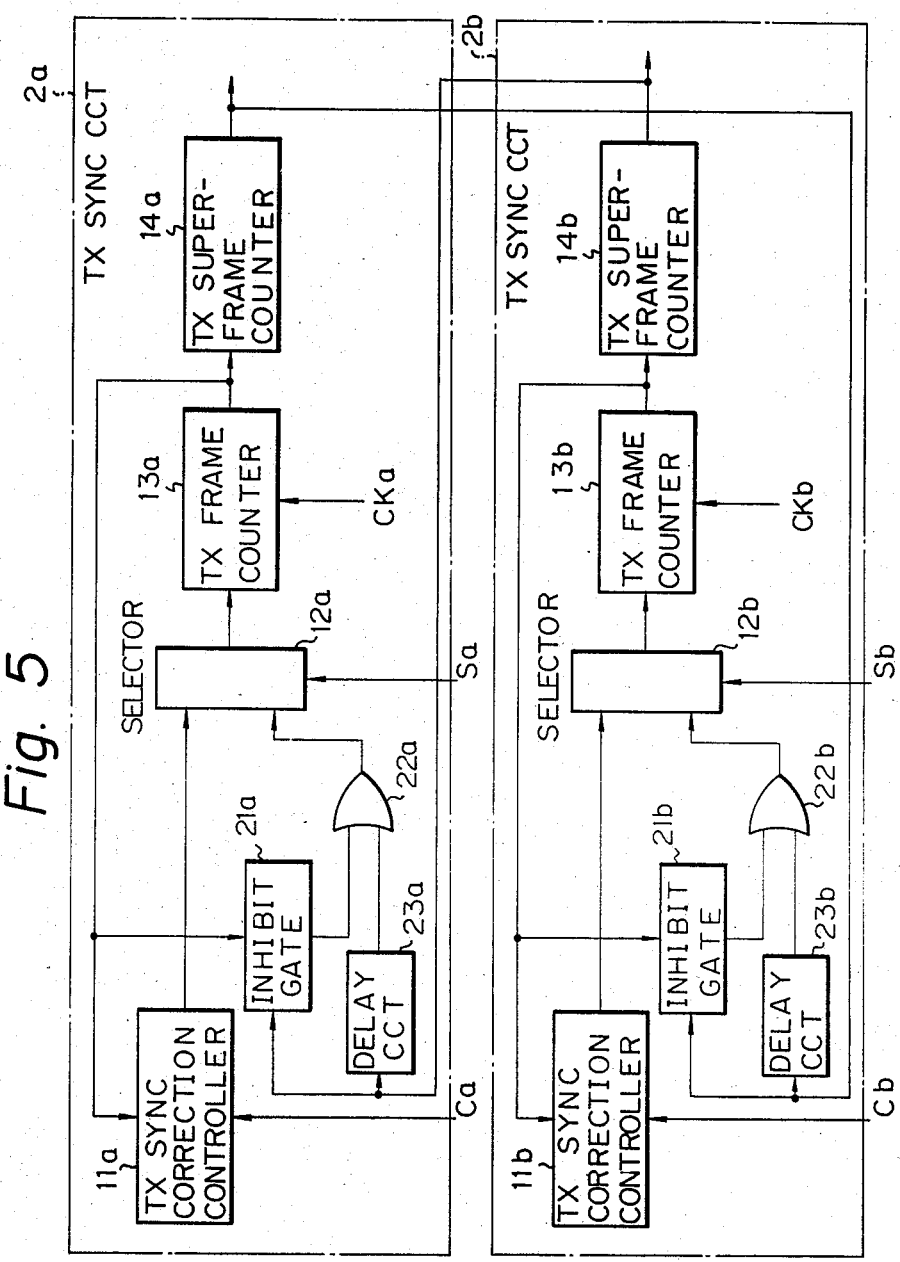
FIG. 5 is a block circuit diagram of a TX synchronization circuit for redundant TDMA communication equipment according to an embodiment of the present invention.

FIG. 5 is a block circuit diagram of a TX synchronization circuit in redundant TDMA communication equipment according to an embodiment of the present invention. A TX synchronization circuit 2a and a TX synchronization circuit 2b comprise the same elements. When one circuit fails, the other circuit takes over the operation. Here, for convenience of explanation, the TX synchronization circuit 2a is referred to as the "active circuit" and the TX synchronization circuit 2b is referred to as the "standby circuit".

The active circuit 2a comprises a TX frame counter 13a for receiving and counting a clock signal CKa, a TX super-frame counter 14a for receiving and counting the output of the TX frame counter 13a and for generating a TX super-frame timing signal TXSFTa when the count reaches a predetermined value, and a TX synchronization correction controller 11a for receiving the output of the TX frame counter 13a and a synchronization correction signal Ca from a TMDA synchronization controller (not shown). The active circuit further comprises a selector 12a for receiving the output of the TX synchronization correction controller 11a at one input terminal thereof, a TX frame timing inhibit gate 21a for receiving the output of the TX frame counter 13a, an OR gate 22a for receiving the output of the inhibit gate 21a at one input terminal thereof and for supplying the output to the other input terminal of the selector 12a, and a delay circuit 23a for supplying the output to the other input terminal of the OR gate 22a.

The standby circuit 2b includes the same elements as the active circuit 2a. These elements are referenced by the same numbers but having suffixes "b". The output of the TX super-frame counter 14a is connected to the control terminal of the inhibit gate 21b and the input terminal of the delay circuit 23b, and the output of the TX super-frame counter 14b is connected to the control terminal of the inhibit gate 21a and the input terminal of the delay circuit 23a, as interconnections between the active circuit 2a and the standby circuit 2b. Further, switching signals Sa and Sb from a redundant circuit switching controller (not shown) are connected to control terminals of the selector 12a and 12b, respectively. As a result, at the active circuit 2a, the output of the TX synchronization correction controller 11a is supplied to the TX frame counter 13a, and, at the standby circuit 2b, the output of the OR gate 22b is supplied to the TX frame counter 13b.

The TX frame counter 13a counts the clock signal CKa from a clock signal generator (not shown) included in each TX synchronization circuit and outputs the TX frame timing signal TXFTa when the count reaches a predetermined value. The TX frame timing signal TXFTa acts as a trigger signal for the TX super-frame counter 14a. When the TX super-frame counter 14a counts a predetermined number of trigger signals, it outputs the TX super-frame timing signal TXSFTa.

In the case of the active circuit 2a, the TX frame timing signal acts as a trigger signal to reset the TX frame counter 13a through the TX synchronization correction controller 11a and the selector 12a. The TX synchronization correction controller 11a includes a delay circuit having a plurality of stages of flip-flop circuits. The delay time is controlled by the selection of the stages by the synchronization correction signal Ca. As a result, synchronization between the reference burst signal and the TX frame timing signal is accomplished.

In the case of the standby circuit 2b, the output of the active TX super-frame counter 14a, namely, the TX super-frame timing signal, is supplied as a trigger signal to the TX frame counter 13b through the delay circuit 23b, the OR gate 22b, and the selector 12b. The delay circuits 23a and 23b have delay times corresponding to the delay times of the TX synchronization correction controllers 11a and 11b. When the active super-frame timing signal TXSFTa is not being supplied, the TX frame counter 13b runs independently by its own TX frame timing signal TSFTb in a "flywheel" operation. Namely, when the active TX super-frame timing signal TXSFTa is not being supplied to the control terminal of the inhibit gate 21b, the inhibit gate 21b is in a conductive state. The inhibit gates 21a and 21b include delay circuits having delay times corresponding to the delay times of the TX synchronization correction controllers 11a and 11b.

Figure 6:
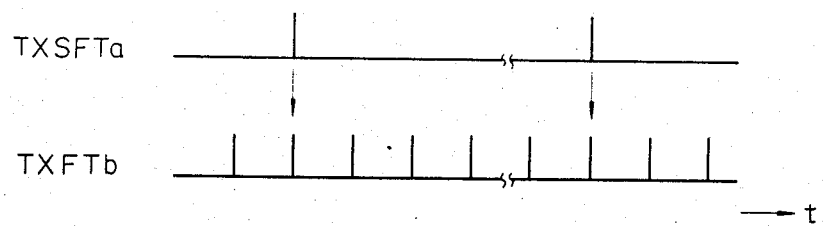
FIG. 6 is a waveform diagram of the circuit of FIG. 5.

The relation between the active TX super-frame timing signal TXSFTa and the standby TX frame timing signal TXFTb is shown in FIG. 6. The phase of the standby TX frame timing signal TXFTb coincides with the phase of the active TX super-frame timing signal TXSFTa when the active TX super-frame timing signal TXSFTa is being supplied. When the active TX super-frame timing signal TXSFTa is not being supplied, the TX frame counter 13b counts its own clock signal CKb.

In the above-mentioned embodiment, the standby TX frame counter 13b is triggered only for each super-frame. Almost all other times, the standby TX frame counter 13b effects a flywheel operation. This means less frequent coupling with the active circuit 2a compared with the prior art and, consequently, less likelihood of the standby circuit 2b being affected by failure of the active circuit 2a. When failure is detected in the active circuit 2a, synchronization of transmission signals is maintained by switching to the standby circuit 2b.

Figure 7:
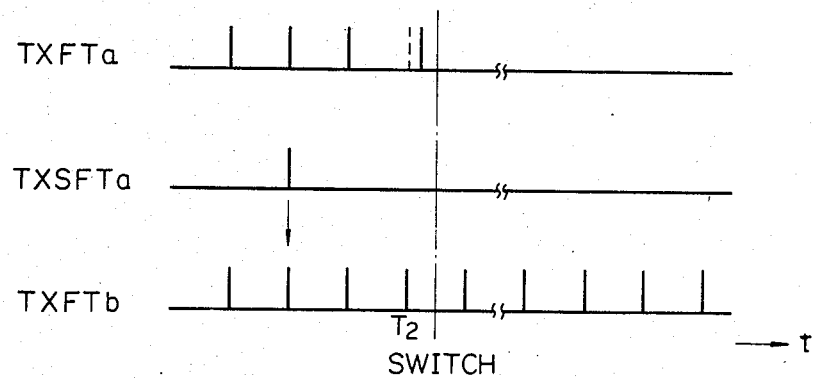
FIG. 7 is a waveform diagram explaining the relation between TX frame timing signals in a case where the active TX frame counter fails.

This aspect is shown in FIG. 7. Even if the active TX frame timing signal TXFTa, which should have the timing shown by the broken line, has the timing shown by the solid line at time T2, the standby TX frame timing signal TXFTb continues at the normal timing since it is independently running except when the active TX superframe signal TXSFTa is supplied to the standby TX frame counter 13b. Therefore, a normal synchronized TX frame timing signal can be obtained continuously by switching to the standby circuit 2b at the timing shown by the chain line.

In this embodiment, the TX superframe counters are used both for their inherent function and for triggering the standby TX frame counter. It is also possible, however, to replace the TX superframe counters with frequency dividers or to provide separate frequency dividers in addition to the counters to supply a frequency divided signal of one TX frame counter as a trigger signal to the other TX frame counter. The above-mentioned frequency divided signal may be selected so that the timing is appropriate (longer) for the switching from the active circuit to the standby circuit.

We claim:

1. A synchronization method in redundant time-division-multiple-access communication equipment having at least an active transmission synchronization circuit for generating an active transmission frame timing signal and a standby transmission synchronization circuit for generating a standby transmission frame timing signal, said method comprising the steps of:
   (a) synchronizing the standby transmission frame timing signal to a frequency divided signal based on the active transmission frame timing signal at timings where the frequency divided signal is supplied; and
   (b) independently running the standby transmission frame timing signal at timings where the frequency divided signal is not supplied.

2. A synchronization method as set forth in claim 1, further comprising a transmission synchronization correction controller providing an output signal, wherein said step (a) comprises the substeps of:
   (i) resetting the active transmission frame timing signal with the output of the transmission synchronization correction controller; and
   (ii) resetting the standby transmission frame timing signal in dependence upon the frequency divided signal and the standby transmission frame timing signal.

3. A synchronization method as set forth in claim 1, comprising the substep of determining the frequency divided signal in accordance with a multiple of the frame timing signals, the frequency divided signal being used as a transmission super-frame timing signal.

4. A synchronization method as set forth in claim 2, comprising the substep of determining the frequency divided signal in accordance with a multiple of the frame timing signals, the frequency divided signal being used as a transmission super-frame timing signal.

5. A synchronization apparatus in redundant time-division-multiple-access communication equipment operatively connected to receive clock signals, synchronization correction signals and redundant switching signals, having at least an active transmission synchronization circuit and a standby transmission synchronization circuit, said active and standby transmission synchronization circuits being selected or unselected and comprising:

a transmission frame counter, operatively connected to receive the clock signals, for counting each clock signal and for supplying a transmission frame timing signal when a count reaches a predetermined value;

a frequency divider, operatively connected to said transmission frame counter, for receiving the transmission frame timing signal and for generating a frequency divided signal;

a transmission synchronization correction controller, operatively connected to said transmission frame counter, for receiving the transmission frame timing signal and the synchronization correction signals and for delaying the transmission frame timing signal in response to the synchronization correction signals;

a logic circuit, operatively connected to said transmission frame counter and said frequency divider, for receiving the transmission frame timing signal and the output of said frequency divider of the unselected transmission synchronization circuit for providing the output of said frequency divider when the output of the frequency divider is supplied, and for providing the transmission frame timing signal when the output of the frequency divider is not supplied; and a selector, operatively connected to said transmission synchronization correction controller and said logic circuit, for receiving the output of said transmission synchronization correction controller, the output of said logic circuit and the redundant switching signals, for selecting the output of said transmission synchronization correction controller when the redundant switching signals command the selection of the active transmission synchronization circuit, for selecting the output of said logic circuit when redundant switching signals command the selection of the standby transmission synchronization circuit, and for resetting said transmission frame counter in accordance with the selected output signal.

6. A synchronization apparatus as set forth in claim 5, wherein said logic circuit comprises:
a delay circuit, operatively connected to said frequency divider, for receiving the output of said frequency divider of the unselected transmission synchronization circuit and providing a delayed output;
an OR gate having a first input terminal operatively connected to said delay circuit and having a second input terminal, for receiving the delayed output of said delay circuit at the first input terminal; and
an inhibit gate having a control terminal, operatively connected to said frequency divider, for receiving the output of the frequency divider of the unselected transmission synchronization circuit at the control terminal thereof and the output of the selected transmission frame counter, for providing the output of said transmission frame counter with a predetermined delay at timings other than the output timing of the frequency divider, and for supplying the output of the inhibit gate to the second input terminal of said OR gate.

7. A synchronization apparatus as set forth in claim 5, wherein said frequency divider is a transmission superframe counter for supplying a transmission superframe timing signal, the timing of which is a multiple of the frame timing signals.

8. A synchronization apparatus as set forth in claim 6, wherein said frequency divider is a transmission superframe counter for supplying a transmission superframe timing signal, the timing of which is a multiple of the frame timing signals.

9. A synchronization apparatus in redundant time-division-multiple-access communication equipment, operatively connected to receive clock signals, synchronization correction signals and redundant switching signals, comprising:
an active transmission synchronization circuit, comprising:
a first transmission frame counter, operatively connected to receive the clock signals, for counting the clock signals and generating a first transmission frame timing signal when the count reaches a predetermined value;
a first frequency divider, operatively connected to said first transmission frame counter, for receiving the first transmission frame timing signal and generating a first frequency divided signal;
a first transmission synchronizaion correction controller, operatively connected to said first transmission frame counter, for receiving the first transmission frame timing signal and the synchronization signals and delaying the first transmission frame timing signal in response to the synchronization correction signals;
a first logic circuit, operatively connected to said first transmission frame counter, for receiving the first transmission frame timing signal and generating an output for providing the first transmission frame timing signal to the output of said active transmission synchronization circuit; and
a first selector, operatively connected to said first transmission synchronization correction controller and said first logic circuit, for receiving the output from said first transmission synchronization correction controller and the output from said first logic circuit when the redundant switching signal commands the selection of said active transmission synchronization circuit, for resetting said first transmission frame counter;
a standby transmission synchronization circuit comprising:
a second transmission frame counter, operatively connected to receive the clock signals, for counting the clock signals and for generating a second transmission frame timing signal when the count reaches a predetermined value;
a second frequency divider, operatively connected to said second transmission frame counter, for receiving the second transmission frame timing signal and generating a frequency divided signal to said first logic circuit of said active transmission synchronization circuit;
a second transmission synchronization correction controller, operatively connected to said second transmission frame counter, for receiving the second transmission frame timing signal and the second synchronization signals and delaying the second transmission frame timing signal in response to the synchronization correction signals;
a second logic circuit, operatively connected to said second transmission frame counter and said first frequency divider of said active transmission synchronization circuit, for receiving the second transmission frame timing signal and generating an output signal, for providing the second transmission frame timing signal at the output and further, for providing the output of said second frequency divider when the first frequency divided signal from said active transmission synchronization circuit is provided; and
a second selector, operatively connected to said second transmission synchronization correcting controller and said second logic circuit and operatively connected to receive the redundant switching signals, for receiving the output from said transmission synchronization correction controller and the output from said second logic circuit when the redundant switching signals command the selection of said standby transmision synchronization circuit and for resetting said second transmission frame counter.

10. A synchronization apparatus as set forth in claim 9, wherein said first and second frequency dividers are transmission super-frame counters for supplying transmission super-frame timing signals, the timing of which is a multiple of the frame timing signals.

* * * * *